April 8, 1930.  A. GASPARICH  1,753,698
INSTRUMENT FOR DRAFTING IRREGULAR CURVES
Filed Nov. 11, 1927   2 Sheets-Sheet 1
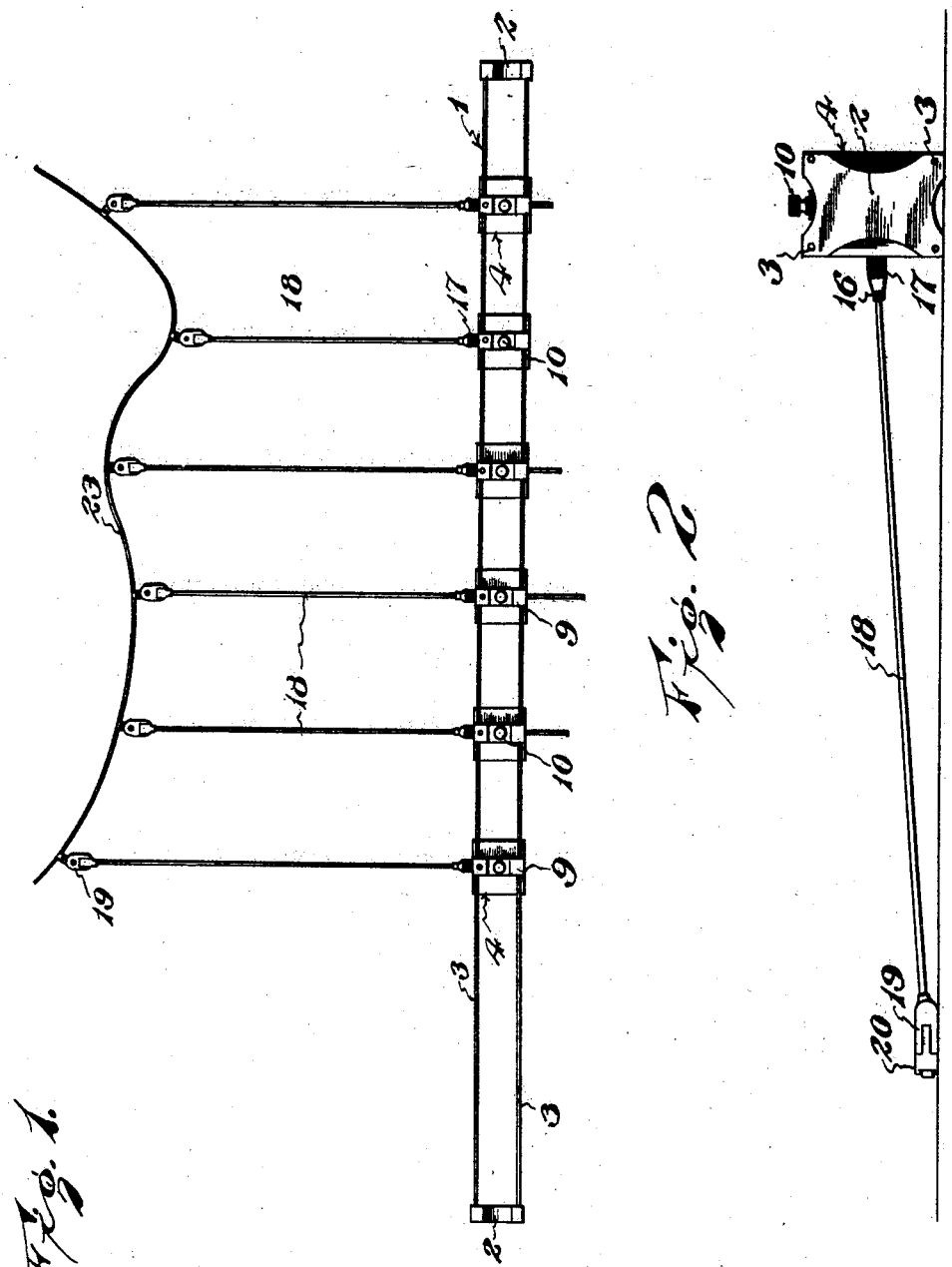

April 8, 1930. A. GASPARICH 1,753,698
INSTRUMENT FOR DRAFTING IRREGULAR CURVES
Filed Nov. 11, 1927   2 Sheets-Sheet 2
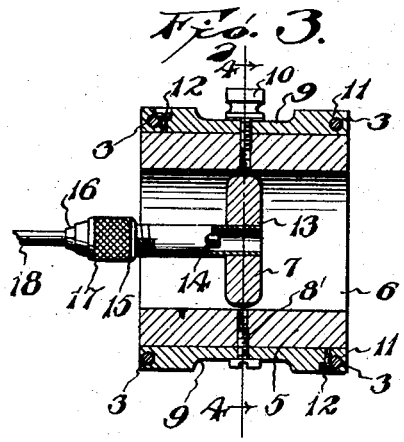
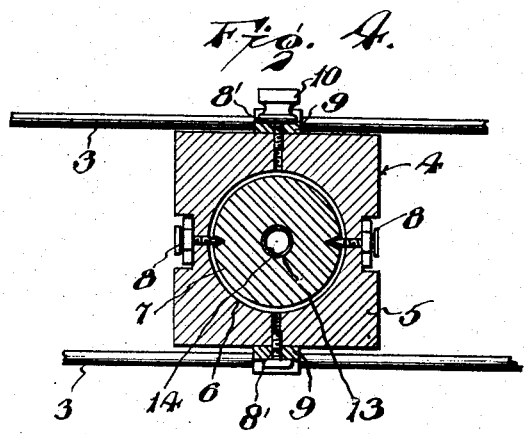
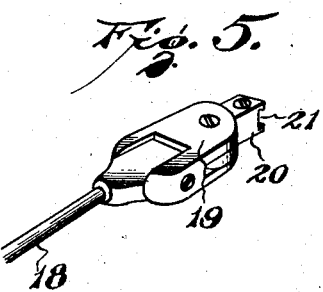
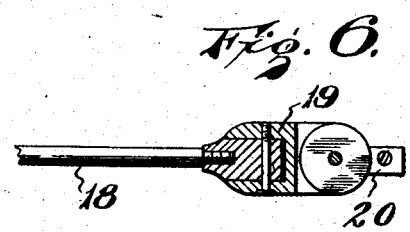
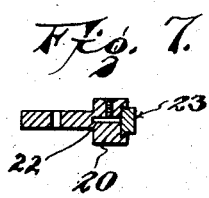
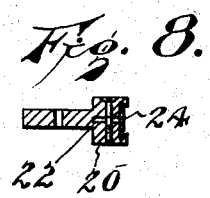
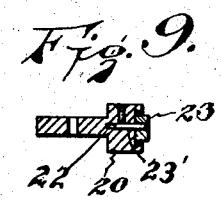
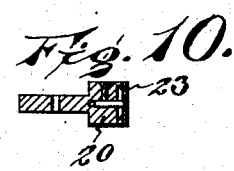
Inventor
Anton Gasparich
By Lacey & Lacey, Attorneys Patented Apr. 8, 1930

1,753,698

UNITED STATES PATENT OFFICE

ANTON GASPARICH, OF OAKLAND, CALIFORNIA

INSTRUMENT FOR DRAFTING IRREGULAR CURVES

Application filed November 11, 1927. Serial No. 232,677.

The present invention is directed to improvements in instruments for drafting irregular curves, and has for its object to generally improve and simplify the constructions disclosed in my prior Patents, Nos. 962,896 and 1,054,109 issued June 28, 1910 and February 25, 1913, respectively.

Another object of the invention is to provide an instrument of this character including a plurality of carriers to which the rule carrying rods can be easily and quickly attached and held in adjusted positions in an extremely simple manner, and further to provide a novel form of connection between the rule carrying rods and rod carriers to enable the rule to lie flat upon the paper.

With these and other objects in view, this invention resides in the novel features of construction, formation, combination and arrangement of parts to be hereinafter more fully described, claimed and illustrated in the accompanying drawings, in which,—

Figure 1 is a top plan view of the implement.

Figure 2 is an end view thereof.

Figure 3 is a transverse sectional view through one of the carriers.

Figure 4 is a sectional view on line 4—4 of Figure 3.

Figure 5 is a detail perspective view of the rule supporting block.

Figure 6 is a detail sectional view through the same.

Figure 7 is a detail sectional view through the rule supporting head.

Figure 8 is a similar view showing another use of the head.

Figure 9 is a similar view showing a rule in the head.

Figure 10 is a similar view showing another form of rule.

The implement comprises a frame 1 which includes a pair of end blocks 2 which have fixed in their corners the ends of the guide rods 3 formed from suitable gage stock.

Slidable upon the frame 1 is a plurality of rod carriers 4, six of which are shown, but it will be of course understood that the number may be decreased or increased, as desired.

These carriers include blocks 5 having bores 6 in which are mounted circular rod supporting heads 7, said heads being pivotally mounted in the bores by screws 8 which are threaded in the blocks from diametrically opposite points, as clearly shown in Figure 4 of the drawings, and will obviously permit the heads to swing.

In order to maintain the carriers upon the rods 3 the upper and lower sides thereof have secured thereto by bolts 8' cross bars 9, the bolts carried by the top bars having knobs 10 thereon. The ends of the bars are provided with transverse openings 11 for slidably receiving the rods 3. Owing to the presence of the bolts 8' the members 4 may be swung when desired, the pivotal axis thereof being disposed at right angles to the pivotal axis of the heads 7 in order that the carriers may have a universal movement.

The lowermost bolts 8' merely serve as pivotal connections, whereas the upper bolts may be manipulated through the medium of the knobs 10 to clamp the blocks 5 to the adjacent bars, thus holding said blocks against pivotal movement and permitting the same to be rocked for adjustment and clamped in a selected adjusted position.

The bars 9 are provided at one of their ends with set screws 12 for engaging the associated rods 3 to clamp the bars and thus the carrier in selected position upon the rod 3.

The rod supporting heads 7 are formed with openings 13 in which are fixed the inner ends of the tubes 14, the outer ends thereof being slit, as at 15, to provide gripping jaws 16 controlled by the chuck collars 17 threaded on said tubes.

The adjusting rods 18 are capable of having their inner ends engaged in the jaws 16 and are held in adjusted positions upon operating the chuck collars 17. Owing to the presence of the tubes 14 rods may be extended thereinto during adjustment. The rods 18 vary in length in order that they may be used in making lines of various curvatures.

The outer ends of the rods 18 have carried thereby heads 19 carrying the pivotally connected blocks 20 in which are formed dovetailed grooves 21 and sockets 22, and since this construction is similar to that disclosed in my Patent No. 1,054,109, a more detailed description is not thought necessary. As in my former patent flexible rules or straight edges 23 may be connected in the grooves 21 and in Figure 9 I have illustrated pins 23' carried by the straight edge secured in sockets 22. In Figure 8 I have illustrated a flexible strip 24 which is adapted to fit in the grooves 21 and serves as a guide in order that the rods 18 may be set and upon removal of the strip a selected straight edge or ruler substituted therefor for actual use.

Since the ruler or straight edge is formed from flexible material it will be obvious that upon adjusting the rods 18 and carriers the rule can be flexed to describe irregular curves of various types.

Since the use and operation of the invention is similar to that of my prior patent a detailed description as to the operation of the present construction is not thought to be necessary, and it will be readily apparent that an instrument constructed in accordance with the present structure will not only be simple in construction, efficient in operation, durable, but can be manufactured at a very small cost.

As shown in Figure 1 the rods are disposed in parallel relation and extend from one side of the frame 1, but it will be of course understood that the carrier 4 may be turned so that the chuck collars 17 or some of them, will extend from the opposite side of the frame, thus permitting the straight edge to bend around the end of the frame. This is possible since the carriers can be rotated.

Having thus described the invention, I claim:

1. An instrument of the class described, comprising a plurality of parallel guide rods, bars adjustable on the rods, blocks rotatably connected with the bars, and having bores therein, heads pivotally mounted in the bores and having tubes fitted therein, a flexible rule, rods for supporting the rule, and means for adjustably connecting the supporting rods in the tubes.

2. An instrument of the class described comprising a plurality of parallel guide rods, bars slidably engaging the guide rods, blocks mounted between the bars and rotatably engaged therewith, said blocks having bores therein, heads pivotally mounted in the bores, ruler supporting rods, and means for adjustably and detachably connecting the said rods with the heads.

3. An instrument of the class described comprising a plurality of parallel guide rods, bars having their ends slidably engaged with the rods, means for holding the bars in fixed adjusted position upon the rods, carriers including blocks, said blocks being mounted between the bars and pivotally connected thereto, means for holding the blocks clamped with the bars to prevent accidental rotation thereof, said blocks having bores therein, heads pivotally mounted in the bores and having their pivotal axes disposed at right angles with respect to the pivotal axes between the bars and blocks, a flexible ruler or straight edge, rods for engagement with the ruler or straight edge, and means for detachably connecting the last named rods with the heads.

In testimony whereof I affix my signature.

ANTON GASPARICH. [L. S.]